United States Patent [19]

Burrows et al.

[11] Patent Number: 5,084,291
[45] Date of Patent: Jan. 28, 1992

[54] PROCESS FOR PREPARING FRENCH FRIED POTATO STRIPS WITH SALT CONTENT

[75] Inventors: Christopher B. Burrows, Kennewick; Janet O. Wheeler; Jerry L. Sloan, both of Richland, all of Wash.

[73] Assignee: Lamb-Weston, Inc., Tri-Cities, Wash.

[21] Appl. No.: 707,271

[22] Filed: May 24, 1991

Related U.S. Application Data

[63] Continuation of Ser. No. 477,035, Feb. 8, 1990, abandoned.

[51] Int. Cl.⁵ .............................................. A23L 1/217
[52] U.S. Cl. ...................................... 426/441; 426/637
[58] Field of Search ................ 426/438, 441, 637, 550

[56] References Cited

U.S. PATENT DOCUMENTS

| | | | |
|---|---|---|---|
| 3,338,724 | 8/1961 | Adler et al. | 426/550 |
| 3,397,993 | 8/1968 | Strong | 426/438 X |
| 3,635,729 | 1/1972 | Englar et al. | 426/637 X |
| 3,881,028 | 4/1975 | Capossela et al. | 426/637 X |
| 4,254,153 | 3/1981 | Ross et al. | 426/637 X |
| 4,298,627 | 11/1981 | Rains | 426/637 |
| 4,447,459 | 5/1984 | Balboni et al. | 426/441 |
| 4,749,579 | 6/1988 | Haydock et al. | 426/637 X |
| 4,751,093 | 6/1988 | Hong et al. | 426/438 |
| 4,839,182 | 6/1989 | Makishima et al. | 426/242 |

FOREIGN PATENT DOCUMENTS

| | | |
|---|---|---|
| 60-27358 | 2/1985 | Japan . |
| 2359672 | 8/1973 | United Kingdom . |
| 1579392 | 3/1976 | United Kingdom . |
| 2078081 | 1/1981 | United Kingdom . |

*Primary Examiner*—Arthur L. Corbin
*Attorney, Agent, or Firm*—Klarquist, Sparkman, Campbell, Leigh & Whinston

[57] ABSTRACT

A method for producing french fried potato strips which includes washing and cutting raw potatoes into suitably sized strips. The raw potato strips are steam blanched, immersed in a hot brine solution, partially dehydrated in hot air, par fried in oil, and then frozen. After par frying, the strips have a solids content of about 20 to 45 percent by weight. The frozen french fries are reconstituted by finish frying, and have a sodium chloride content of about 0.5 to 2 percent by weight.

6 Claims, No Drawings

PROCESS FOR PREPARING FRENCH FRIED POTATO STRIPS WITH SALT CONTENT

This application is a continuation of application Ser. No. 74/477,035, filed on Feb. 8, 1990, now abandoned.

FIELD OF THE INVENTION

The present invention relates generally to food processing, and more particularly to a method for preparing french fried potato strips.

BACKGROUND OF THE INVENTION

Commercially prepared french fried potato strips (or so-called french fries) typically are prepared by slicing whole potatoes into strips, blanching the strips in hot water, parfrying the strips in oil, and then freezing the strips. The frozen potato strips are reconstituted by frying them in oil, draining off the oil, and then salting them. Commercially prepared frozen french fried potato strips typically have a uniform, light golden color, a relatively dry mealy potato interior, and a somewhat subdued potato flavor.

Two known processes used in preparing potato products for the food service industry are disclosed in U.S. Pat. No. 3,397,993 to Strong and U.S. Pat. No. 3,635,729 to Englar.

The Strong patent discloses a process in which raw potato strips are blanched in either steam or hot water until the potato strips are turned uniformly translucent in appearance. The blanched strips are then dried in hot air at a temperature within the range of 150 degrees to 350 degrees Fahrenheit for 5 to 20 minutes, resulting in a weight loss of at least 20 percent. After the air drying step, the potato strips are parfried in oil at a temperature within the range of 300 to 375 degrees Fahrenheit for 15 to 60 seconds, and then frozen. The end user then reconstitutes the frozen strips by finish frying them in hot oil.

The Englar patent discloses a method of producing dehydrated hash brown potatoes with a final moisture content of about 7.5 percent. In this process, the raw shredded potato is blanched in water within a temperature range of 180 degrees to 212 degrees Fahrenheit for 5 to 10 minutes. The blanching water contains a salt such as sodium acid pyrophosphate or sodium chloride or a combination of the two. In one example, the blanching water contains 1 pound of sodium chloride in 10 gallons of water. The resulting precooked strips are then partially dehydrated in a fluidized bed dehydrator to a moisture content of about 20 to 30 percent, coated with a starch solution, and then further dehydrated in a fluidized bed dehydrator to a final moisture content of about 7.5 percent. The resulting dehydrated and starch coated potato product does not require refrigerated transportation or storage and is unaffected by temperature fluctuations.

Other known processes for preparing potato or other food products are identified below.

Lamb U.S. Pat. No. 3,219,461 discloses a process for partially dehydrating and freezing food products, such as carrots, grapes, pears, and meat. In one example, carrots are blanched in steam, vacuum frozen and then subjected to a calcium chloride brine as the vacuum is released. As the vacuum is released, the calcium chloride brine is infused into the frozen product.

Chase U.S. Reissue Pat. No. 23,890 discloses a process for preparing frozen potatoes in which the potato strips are blanched, cooled and dried to produce a 10 to 15 percent moisture loss and then frozen.

Netherland Patent 7703461 discloses a process for preparing potato chips in which potato slices are blanched in water, cooled, blanched again in water, dried in warm air to produce a 10 to 15 percent weight loss, equilibrated at room temperature, fried, and finally frozen.

In another prior commercial potato process, raw potato cubes or strips are immersion blanched in a hot water solution containing two percent sodium chloride for 5 to 10 minutes. The cubes are then washed in a water solution containing sodium acid pyrophosphate (to help preserve color) and sugar for about 30 to 45 seconds. The cubes are then dried long enough to cause a loss in weight of 7 to 15 percent. The cubes are then parfried in oil at a temperature of 375 degrees Fahrenheit for 30 to 90 seconds, and then frozen. This process results in a finished potato product having a sodium chloride content of about 0.8 to 1.2 percent.

In contrast to commercially prepared french fries, natural home-made french fries typically are prepared by cutting whole potatoes into strips and frying the strips. Homemade french fries typically have a darker, varied golden color, a stronger potato flavor and a relatively moist potato interior. Homemade french fries are quite distinct in character from commercially prepared french fry products.

There is a need in the food service industry for a frozen french fried product which, when reconstituted, more closely resembles a natural homemade french fry. Many restaurants desire to serve food that has the appearance and flavor of freshly prepared product, yet desire the relative ease, convenience, and economy of commercially manufactured products. Further, most commercially prepared french fries are not salted by the manufacturer because it is difficult to incorporate dehydrated salt at any step of traditional french fry processing. This results in the end user having to add salt to the product after the finish frying step, which in turn leads to non-uniform application of salt on the fried product both within a single batch, and more severely, between batches. Flavor differences may therefore be present in the finished product. Accordingly, there is a need for a frozen french fry that contains a uniform concentration of salt when the restaurant or other end user serves the product to the customer.

It is therefore one object of the present invention to provide a process for preparing high quality frozen french fried potato strips which have flavor, texture, and visual attributes similar to homemade french fried potatoes.

Another object of the present invention is to provide a process for preparing frozen french fried potato strips which, upon reconstitution, have a desirably crisp outer surface, a moist interior, and a desirable flavor and texture.

Yet another object of the present invention is to provide a process for preparing frozen potato strips which, when reconstituted, have a uniformly dispersed salty taste, making it unnecessary for the end user to salt the product.

Still another object of the present invention is to provide a process for preparing frozen potato strips which, when reconstituted, having improved product characteristics.

Other objects and advantages of the invention will become apparent from the following detailed description.

SUMMARY OF THE INVENTION

In accordance with the foregoing objectives, the present invention comprises an improved process for preparing frozen french fried potato strips. The strips are blanched, immersed in a hot brine solution, partially air dried, parfried and then frozen. Optimally, the strips are blanched primarily in steam for about 0.5 to 2 minutes. The blanched strips are then soaked in a brine solution containing 1 to 6 percent sodium chloride, at a temperature of about 150 to 210 degrees Fahrenheit. Immediately thereafter the strips are dried in hot air for about 4 to 15 minutes, then parfried in oil, and frozen.

The foregoing process produces a high quality frozen french fry product having "homemade" appearance, texture, and flavor, and an integrally incorporated salt content.

DETAILED DESCRIPTION OF A PREFERRED EMBODIMENT

In accordance with the present invention, raw potatoes, preferably of the Russet Burbank variety, are cleaned, trimmed and inspected for defects. The potatoes are cleaned using a water flume or spray. The potatoes are then cut into sections suitably sized for french fried potato strips.

The potato strips are blanched primarily in steam at a temperature within the range of about 200 degrees Fahrenheit to 225 degrees Fahrenheit for about 0.5 to 2 minutes to gelatinize the potato cells. Preferably, the strips are blanched at about 210 degrees Fahrenheit for 60 seconds. The steam blanching step affects several attributes of the finished product.

First, the blanching step minimizes the amount of leaching of natural sugars and flavor components present in the potato strips. Next, the blanching inactivates enzymes present in the raw potato product which would otherwise cause oxidation. Finally, the blanching step gelatinizes the potato cells at the surface of the strips and also reduces the amount of fat absorbed by the strips during later processing. As a result, the blanching step contributes to a final product having a crisp external surface, a desirable moist internal texture, and a hearty potato flavor.

It is not essential that strips be blanched exclusively in steam. For example, the strips may be blanched in a steam blancher having hot water traps at entrance and exit ends which serve to allow strips to enter and exit the blancher on a conveyor without allowing steam to escape from the blancher. In this type of blancher, the strips enter the blancher on a conveyor and pass through a first water trap at a temperature within the range of about 65 to 200 degrees Fahrenheit, and located just inside the entrance of the blancher. The conveyer then carries the strips out of the water trap and into a steam blanching chamber for a predetermined length of time. The strips are discharged from the blancher by passing them through a second water trap similar to the entrance water trap.

The blanched strips are next soaked in a brine solution, which contains about 1 to 6 percent sodium chloride by weight, and has a temperature of about 150 to 210 degrees Fahrenheit, for about 15 to 90 seconds. Preferably, the brine solution contains about 2 to 4 percent sodium chloride at a temperature of about 180 to 200 degrees Fahrenheit, and the potato strips are soaked for about 30 to 45 seconds. The brine solution may contain other ingredients such as dextrose or salts such as sodium acid pyrophosphate. The elevated temperature of the salt brine solution increases the efficiency of uptake of salt by the potato tissue since the potato cells absorb the salt more efficiently at higher temperatures. The brine soaking step is preferably a separate and distinct step from the prior blanching step.

Immediately after the potato strips are removed from the salt brine solution, they are dried in hot air at a temperature within the range of about 150 to 225 degrees Fahrenheit for about 4 to 15 minutes, preferably at about 210 degrees Fahrenheit for about five minutes. The drying time will vary, and depends primarily on the size of the potato strip. The drying step reduces the weight of the potato strips at least five percent, and preferably by 10 to 15 percent. The drying of the surface of the potato strips helps to bind the salt which was introduced into the potato in the prior brine soaking step by dehydration of the surface moisture of the potato cells. The drying step also enhances the crispness of the surface texture.

The partially dried strips are next parfried in hot oil at a temperature within the range of about 325 to 400 degrees Fahrenheit, preferably at about 370 degrees Fahrenheit. The frying time is within the range of 10 to 120 seconds, and preferably for about 50 seconds. Par frying increases the solids content of each potato strip by causing it to lose moisture and absorb oil. Par frying is continued for a period of time sufficient to cause the strips to have a solids content preferably within the range of 25 to 40 percent, depending upon the thickness of the strip. The parfried strips will have a sodium chloride content within the range of about 0.5 to 2 percent by weight, and an oil content within about the range of 1 to 12 percent by weight, also depending upon the size of the strip. The drying and parfrying steps increase the solids content of the strips by decreasing the moisture content; as a result the sodium chloride content of the strips is increased slightly in each of these steps.

The strips are next frozen and packaged in a conventional manner for storage and/or shipment.

The frozen potato strips are reconstituted by finish frying them in oil at a temperature within the range of about 330 to 370 degrees Fahrenheit, preferably at about 350 degrees Fahrenheit. The finish frying time is within the range of about 2 to 4 minutes. The resulting french fries will have a solids content of about 45 to 70 percent by weight, including about 0.5 to 2 percent sodium chloride and about 7 to 20 percent oils. The preferred content of sodium chloride is about 1.0 to 1.3 percent by weight. The composition of the frozen strips depends upon their size: smaller cut strips will tend to have relatively higher solids and oils contents; larger cut strips will have relatively lower solids and oils contents.

French fried potato strips prepared in accordance with the foregoing process are more similar to homemade french fries in appearance, texture, and flavor, than french fries made by conventional commercial processes. The steam blanching step contributes to the natural color variations by leaching less of the natural sugars from the raw potato. This color variation exists both within a single french fry and between french fries. The final product also has a darker color than most commercially prepared french fries. Similarly, this step adds to the crispy texture of the surface of the french fry and causes the interior to retain more of the natural potato flavor, resulting in a stronger potato flavor.

Immersion of the blanched strips in the hot sodium chloride brine causes the potato tissue to be infused with sodium chloride. This results in a finished product with a uniform salty flavor.

Partial dehydration of the strips immediately after they are removed from the brine solution also improves the flavor and texture of the final product. As the surface of the potato strips dry in the hot air, surface moisture is evaporated, concentrating the surface solids and salt residue. This prevents the sodium chloride from being lost in the parfrying step. The dehydration step also adds to the crispy surface texture of the final product while maintaining the moist interior texture which is typically found in homemade french fries.

EXAMPLE 1

Raw, cleaned Russet Burbank potatoes were preheated for 25 minutes in a water bath at 130° F., and were then cut into 5/16 by ⅜ inch strips on an Urschel Laboratories, Inc. model GRL cutter. Three to four pounds of strips were placed in a perforated metal basket and were water blanched for 30 seconds at 170° F. The strips were then placed in a vented steam cabinet and steam blanched for 1 minute at atmospheric pressure by injecting steam at 216° F. directly into the cabinet. The steamed strips were again water blanched for 30 seconds at 170° F., and then dipped for 30 seconds in a 190 degree Fahrenheit solution containing 4 percent sodium chloride by weight.

The potato strips were then placed in a conventional forced air cabinet dryer and were dried at 210° F. for approximately 4 to 6 minutes, resulting in a 12 to 14 percent weight loss. The partially dehydrated strips were then parfried in a conventional deep fat fryer for 55 seconds at 375° F. The strips were then frozen at −20° F. in a conventional blast freezer.

The frozen french fries contained an average of 1.0 percent sodium chloride, 4.12 percent oils, and 30.66 percent solids.

The frozen french fries were reconstituted in a deep fat fryer at 360° F. for 3 minutes, 30 seconds. The resulting french fries were typical of a homemade product and had a desirable golden color with some variation in color both between strips and within each strip. The fries had a crisp outside, and a moist interior texture. The natural potato flavor of the french fries was enhanced by the background salt flavor.

EXAMPLE 2

In another example, raw, peeled Russet Burbank potatoes were cut into 9/32 inch cross-section strips on an Urschel cutter. Three to four pounds of the strips were placed in a perforated metal basket and steam blanched at atmospheric pressure with 216° F. steam for 1 minute in a vented steam cabinet. The steamed strips were then dipped in 65° F. water for 30 seconds, and then dipped in a solution containing 2.5 percent sodium chloride and 0.30 percent dextrose for 30 seconds. This dipping solution was at 190° F. The strips were then air-dried at 210° F. for about 4 minutes, resulting in 10 to 12 percent weight loss. The partially dehydrated strips were then parfried for 30 seconds at 375° F., and then frozen at −20° F.

The frozen french fries contained an average of 0.74 percent sodium chloride, 6.69 percent oils, and 34.63 percent solids, by weight.

The frozen french fries were reconstituted by deep fat frying at 360° F. for 2 minutes, 45 seconds. The finished product had a relatively dark golden color similar to homemade fries, and had natural color variations both between fries and within each fry. The product had a crisp exterior and a moist interior. A background salt taste enhanced the hearty, natural potato.

EXAMPLE 3

In this example, raw, spiral-cut potatoes were steam blanched at atmospheric pressure in a vented steam cabinet for 1 minute, 15 seconds by injecting steam at 216° F. The strips were then dipped in a solution containing 2.5 percent sodium chloride, 0.30 percent dextrose, and 0.75 percent sodium acid pyrophosphate for 30 seconds. This solution was held at 190° F. The strips were then air dried at 210° F. for 4 to 6 minutes, resulting in a 12 to 15 percent weight loss. The strips were then parfried at 375° F. for 50 seconds, and were then frozen at −20° F. The frozen spiral-cut potatoes contained an average of 0.98 percent sodium chloride, 6.41 percent oils, and 36.32 percent solids, by weight.

The frozen product was reconstituted by deep fat frying at 360° F. for 2 minutes, 45 seconds. The resulting product had a light golden color with some natural color variations, crispy outside and moist inside, a hearty potato flavor, and a slightly salty background taste.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims.

What is claimed is:

1. A process for preparing french fried potato strips suitable for reconstitution comprising the steps of:
   cutting whole potatoes into strips;
   thereafter preparing the cut strips according to a process consisting of the steps of:
   a) blanching the strips in steam for about 0.5 to 2 minutes;
   b) thereafter immersing the strips in a brine solution of sodium chloride containing about 1 to 6 percent sodium chloride by weight and at a temperature within the range of about 150 degrees to 200 degrees Fahrenheit for about 15 to 90 seconds in order to infuse sodium chloride into the tissue of the strips; and
   c) immediately thereafter partially drying the strips in hot air at a temperature within the range of 150 degrees to 225 degrees Fahrenheit for about 4 to 15 minutes to cause a decrease in weight of about 10 to 15 percent; and
   there after processing the strips in a process comprising:
   parfrying the strips in oil; and then
   freezing the strips.

2. The method according to claim 1 wherein the strips are immersed in the sodium chloride solution at a temperature and for a period of time sufficient to cause the strips to have a sodium chloride content of about 0.5 to 2 percent by weight after parfrying.

3. The method according to claim 1 wherein the strips are parfried in oil at a temperature of about 324 to 400 degrees Fahrenheit for about 10 to 120 seconds.

4. The method according to claim 3 wherein the strips are parfried for a period of time and at a temperature sufficient to cause the strips to have a solids content of about 25 to 40 percent by weight when frozen.

5. The method according to claim 1 wherein the strips are parfried for a period of time and at a temperature sufficient to cause the strips to have a solids content of about 25 to 40 percent by weight when frozen.

6. The method according to claim 1 wherein the frozen strips are reconstituted by frying in hot oil within a temperature range of about 330 to 370 degrees Fahrenheit, for about 2 to 4 minutes, causing the strips to have a solids content within the range of about 45 to 70 percent by weight, including about 7 to 20 percent oils, and including about 0.5 to 2 percent sodium chloride.

* * * * *